United States Patent Office 3,280,001
Patented Oct. 18, 1966

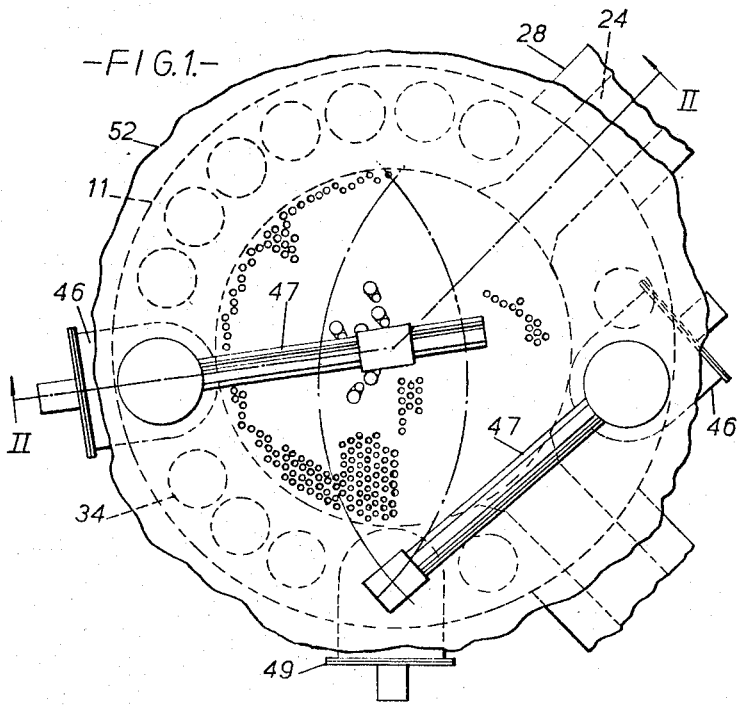
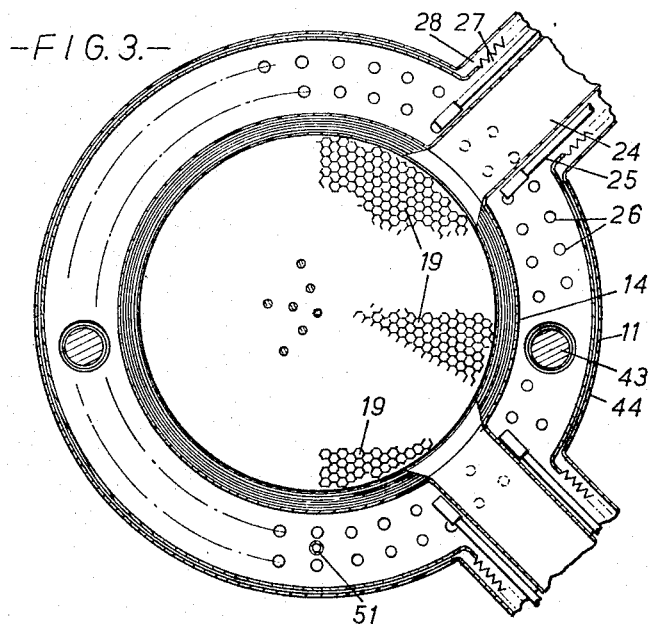

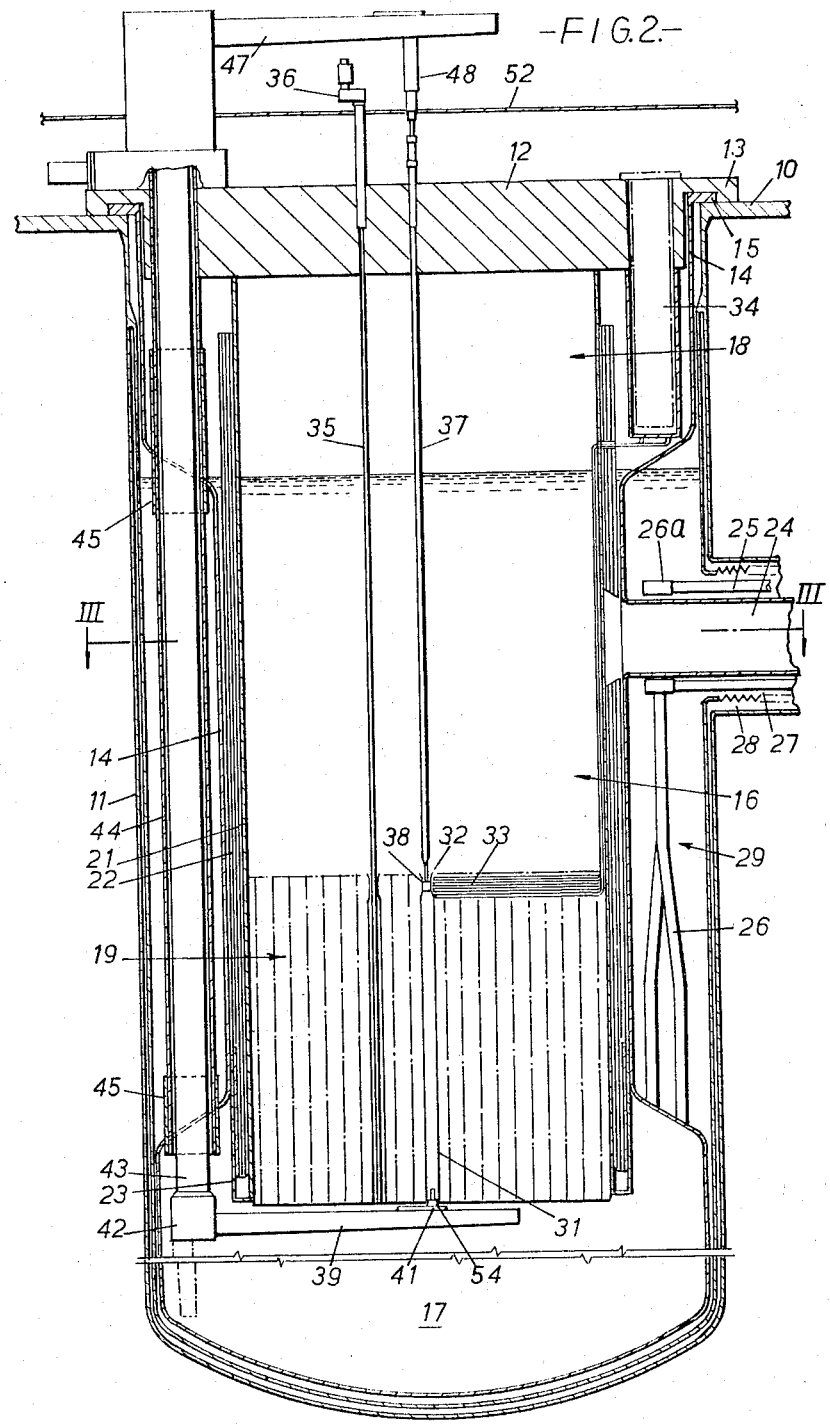

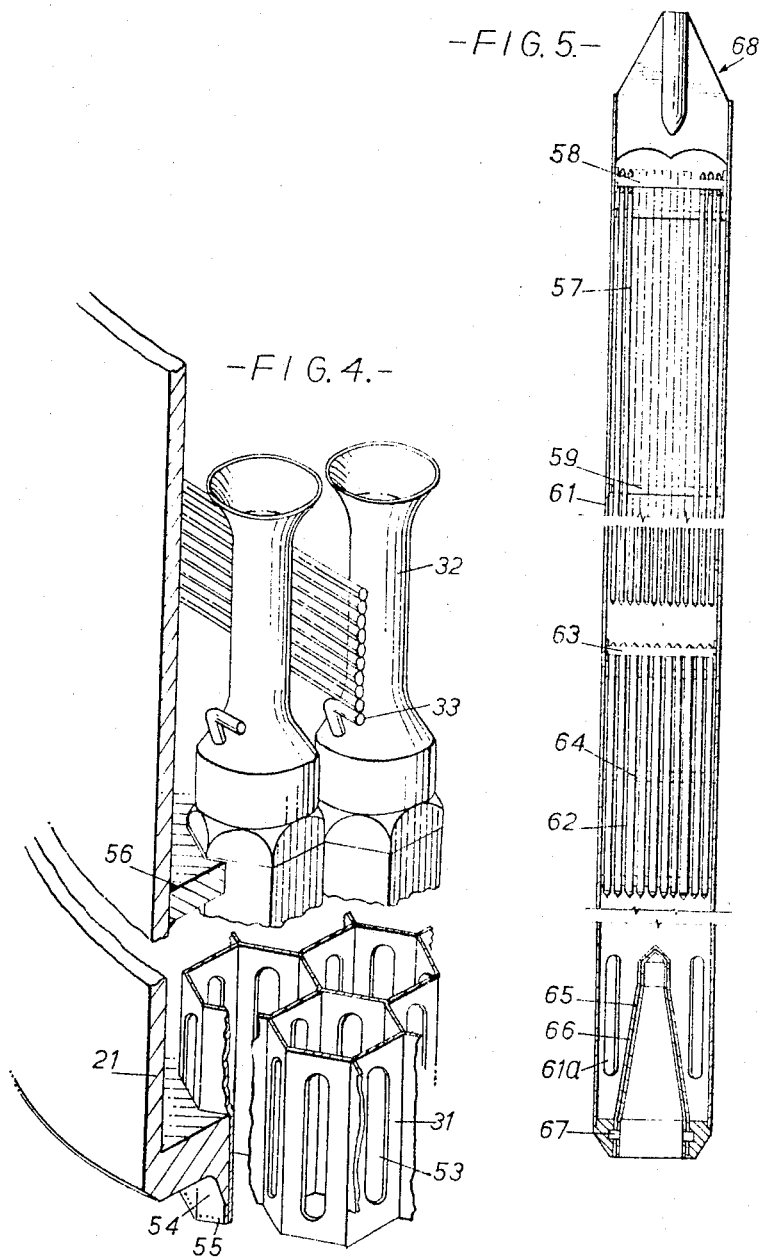

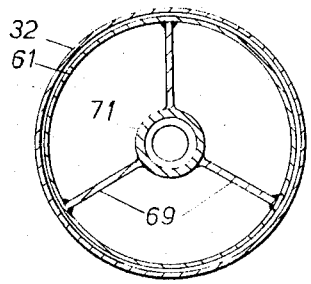
-FIG. 7.-
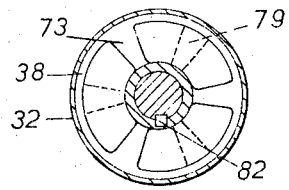
-FIG. 8.-
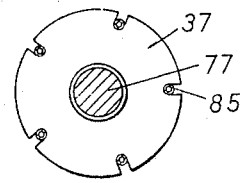
-FIG. 9.-

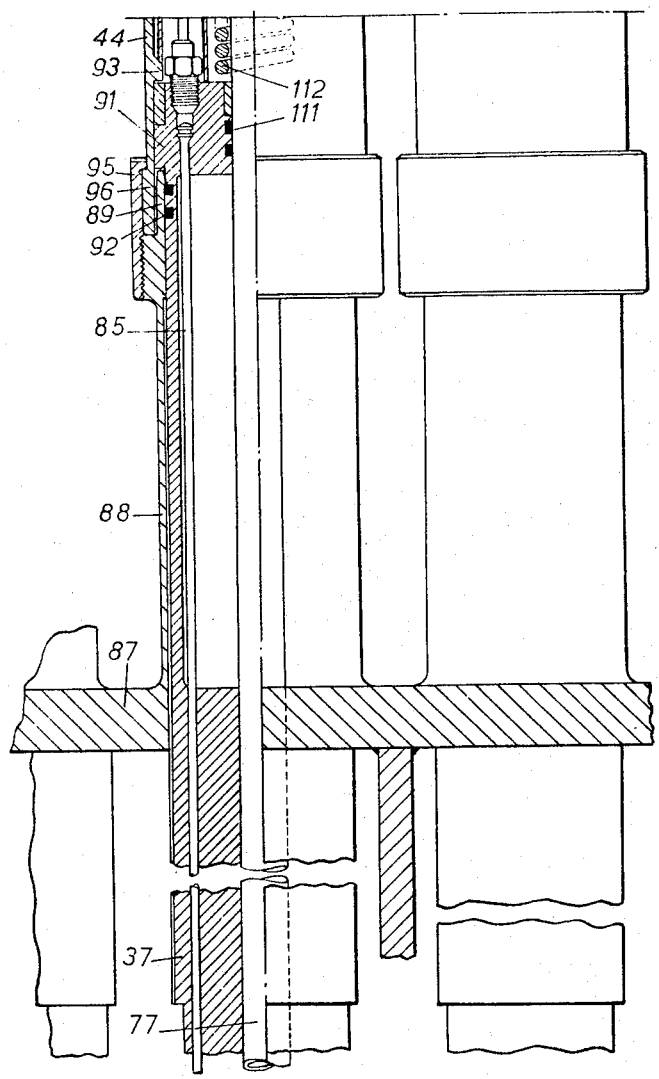

3,280,001
NUCLEAR REACTOR WITH FUEL HANDLING APPARATUS
John Stacey, Bolton, and Peter Liptrot Riley and Horace Frank Parker, Culcheth, Warrington, England, assignors to United Kingdom Atomic Energy Authority, London, England
Filed June 17, 1964, Ser. No. 375,868
Claims priority, application Great Britain, June 25, 1963, 25,189/63
10 Claims. (Cl. 176—30)

This invention relates to nuclear reactors and is especially although not exclusively applicable to so-called fast reactors. The virtual absence of moderation which is characteristic of fast reactors entails that the core is compact; the core is also generally designed such that the fuel, being highly enriched for sustaining the fast fission chain reaction, has a high heat rating. To remove the heat generated by the fuel a coolant forced through the core is required, on account of the compact nature of the core, to flow at high velocity and with upward flow of the coolant through the core it is generally the case that units bearing the fuel are subject to a net upward force during operation. Some other expedient apart from the dead weight of the units must therefore be used in these circumstances to hold down the fuel units.

According to the present invention, a nuclear reactor comprises a vessel to house a core of elongate nuclear fuel units, a support platform disposed to be above the core, means to circulate reactor coolant in the vessel through the core to abstract heat from fuel units thereof, rigid struts depending from the platform, means at the lower ends of the struts by which the fuel units are attachable thereto for support in the core, and fuel handling apparatus to present fuel units beneath the struts for engagement with the attachment means.

When applied in the circumstances of the fuel units being subject in operation to a net upward force, the struts may be constructed to resist this force in compression; alternatively there may be a grid structure for the fuel units such that the struts serve only in tension to maintain engagement with the grid structure.

The provision of a strut for each fuel unit yields the possibility of utilising the struts as carriers of instrumentation for individual fuel units. Accordingly, in one embodiment of the invention, each strut is formed adjacent the attachment means with a chamber through which flows coolant from an attached fuel unit, and a variable flow restrictor to control flow of coolant through the chamber is adjustable by means of a spindle housed in the associated strut. Moreover, in this embodiment of the invention, the spindles may also be adapted to operate fastenings by which the units are attachable. It is a further feature of the invention that electrical instrumentation for the fuel units may be connected to electrical leads carried by the rigid struts.

In a fast nuclear reactor there is difficulty in locating fuel units which must be closely packed in the reactor core and yet must not be susceptible to cumulative lateral distortion, that is to say distortion in one fuel unit which is aggravated by distortion in an adjacent fuel unit. Where the fuel units are supported against axial movement solely by the struts and independently of any core structure, the invention makes it practicable to mount within the vessel a core tube assembly which may be of thin metal owing to the absence of vertical loading, the assembly having open-ended core tubes to receive and locate fuel units: owing to its fine structure the assembly occupies little of the core volume.

Constructions of fast nuclear reactor embodying the invention will now be described by way of example with reference to the accompanying drawings in which:

FIGURE 1 is a plan view of the first reactor construction,

FIGURE 2 is a simplified sectional elevation on the line II—II of FIGURE 1,

FIGURE 3 is a sectional view on the line III—III of FIGURE 2,

Figure 6A:
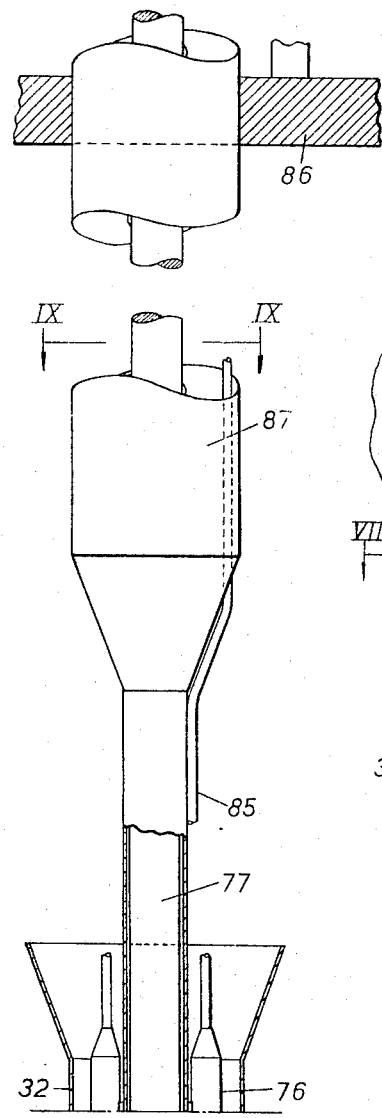
Figure 6B:
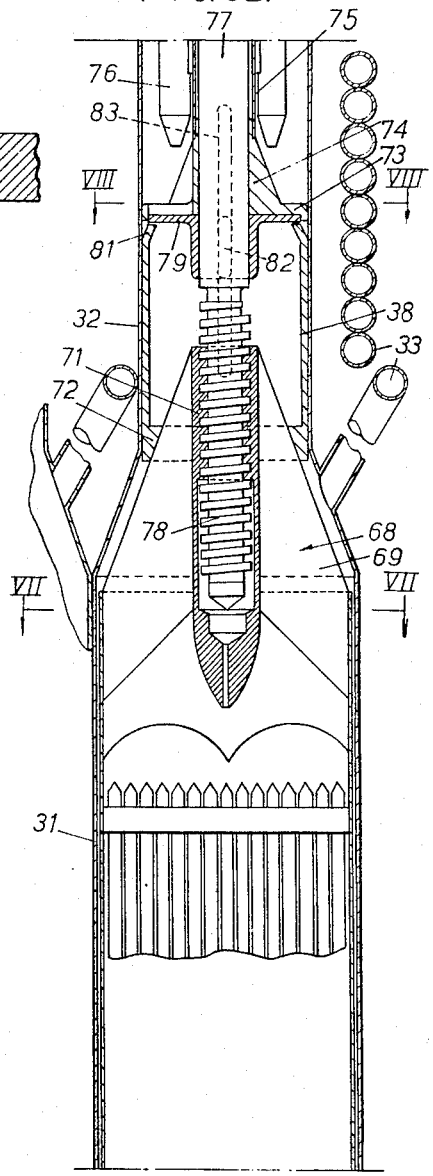
Figure 10A:
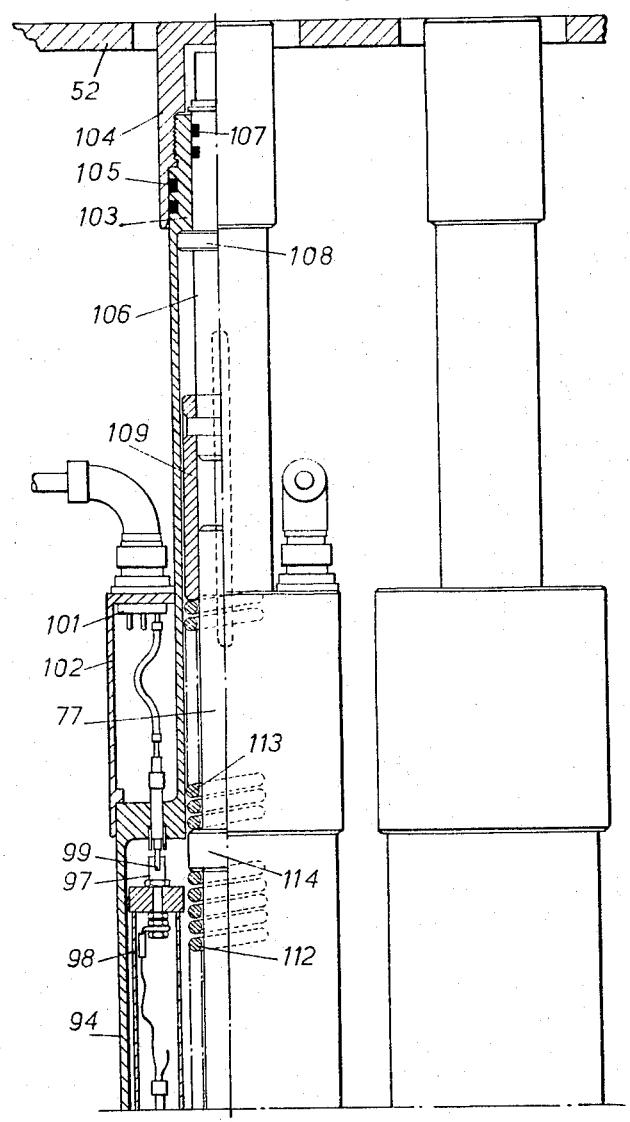
Figure 11:
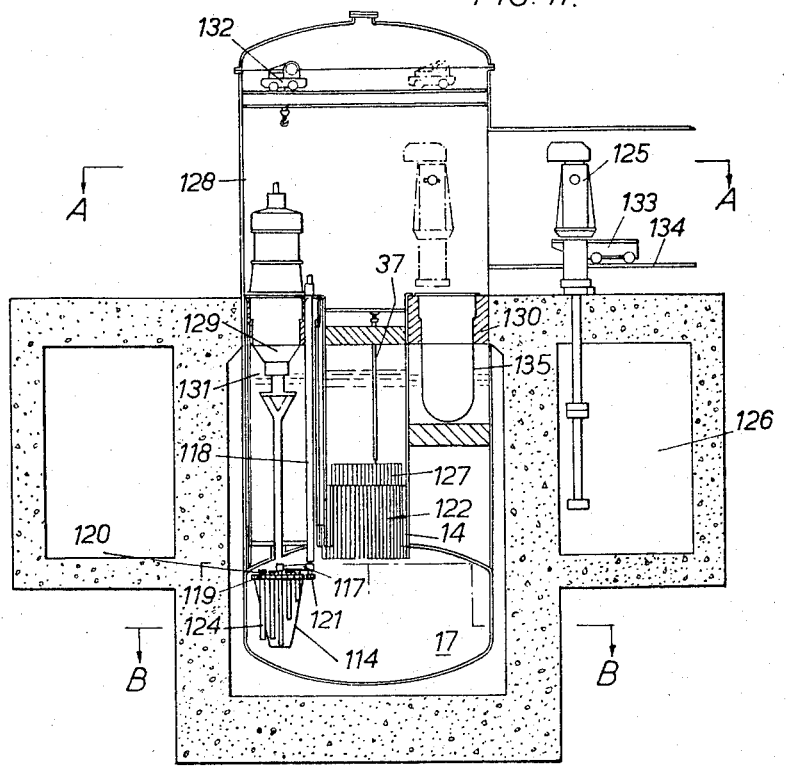
Figure 12:
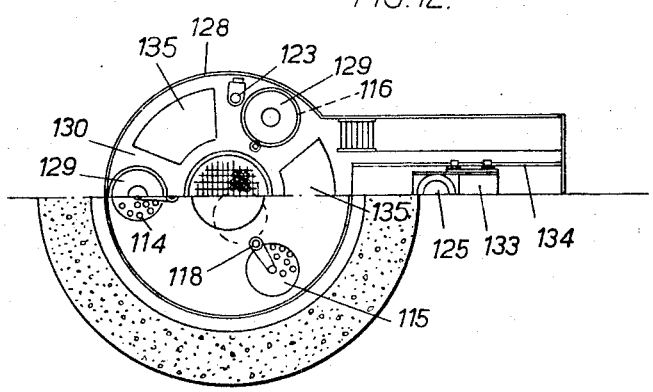

FIGURE 4 is a perspective view of part of a core lattice embodied in the reactor with part of the lattice cut away, FIGURE 5 is a sectional elevation of a fuel unit for the reactor, FIGURES 6A and 6B placed end to end represent a sectional elevation of a strut and socket for the reactor, FIGURES 7, 8 and 9 are sectional views on lines VII—VII, VIII—VIII, and IX—IX respectively of FIGURES 6A and 6B, FIGURES 10A and 10B placed end to end represent a sectional view of the upper part of a strut showing the structure by which it is supported from the reactor platform, FIGURE 11 is a simplified sectional elevation of an alternative reactor construction, and FIGURE 12 is a plan, the top half being as viewed on the line A—A of FIGURE 11 and the bottom half being as viewed on the line B—B of FIGURE 11.

The construction of FIGURES 1 to 10 will be described first.

*General assembly*

A support platform of composite structure comprises a flange 10 (FIGURE 2) from which a double-walled reactor vessel 11 is dependent, and an upper reactor shield 12 (diagrammatically represented in FIGURE 2) having a flange 13 mounted on the flange 10; support structure for the flange 10 is omitted for the sake of clarity. A core tank 14 depending from the support platform is secured by an upper flange 15 interposed between the upper shield 12 and the flange 10. The tank 14 has a central waisted section 16, below which is a bulbous fuel handling section 17 and above which is an instrumentation section 18. Housed within the core tank, a cellular core tube assembly 19 is carried by a cylindrical baffle 21 dependent from the upper shield 12. A thermal shield 22 carried by the baffle 21 forms a close fit within the waisted section of the tank and is enclosed at its lower end in a casing 23 which is a sliding fit in the waisted tank section. The core tank is filled with reactor coolant in the form of liquid sodium which is circulated upwardly through the core tubes to abstract heat from fuel elements therein; the coolant leaves the tank by way of an outlet duct 24 and re-enters the reactor vessel through piping 25 disposed in a coaxial inlet duct 27 which piping communicates through a ring header 26a with pipes 26 leading to a high pressure coolant inlet plenum constituted by the fuel handling section 17 of the reactor tank. The ducts 27 interconnect with the annular chamber 29 surrounding the waisted section of the tank the interiors of other tanks (not shown) in which are accommodated the heat exchangers to which the outlet ducts 24 conduct the hot coolant from the core lattice, these exchangers being arranged to discharge directly into the respective tank interior in the manner of an open cycle. Surrounding the duct 27 is a leakage duct 28 which is a continuation of the outer wall of the double-walled reactor vessel.

The core tube assembly 19 is a cellular structure defining open-ended, hexagonal tubes 31 to receive fuel and control units, each tube being formed with a cylindrical, waisted outlet 32 at its upper end and each being provided with a sampling pipe 33 by which a sample of the coolant from the respective tube can be taken to instrumentation designed to detect radioactive fission products in the sample and thus to indicate damage to a fuel unit in that tube. This instrumentation is housed in thimbles 34 in the upper section of the reactor tank to which groups of the pipes 33 are led. Control units 35 (of which one is indicated in FIGURE 2) take the form of elongate thimbles depending from the upper shield 12 and surmounted by drive mechanism 36 to actuate a screw mechanism for moving axially a neutron-absorbing control rod within the thimble. Struts 37 (of which one is indicated in FIGURE 2) also depend from the upper shield 12 and carry sockets 38 which are located over the core tubes 31 in the outlets 32. Elongate fuel units within the core tubes engage the sockets 38 and are supported by the struts without loading the tube assembly which serves only to impart lateral stability to the fuel units. During operation of the reactor the upward flow of coolant through the core tubes is so great as to impart a net upward force on the fuel units which is transmitted by the struts in compression to the reactor support platform.

Fuel handling apparatus by which fuel units are raised into and lowered out of the core tubes comprises an arm 39 supporting a carrier in the form of a movable pintle 41 to enter a socket in the lower end of a fuel unit. The arm 39 is mounted at a joint 42 on an upright shaft 43 which is slidable and rotatable in a housing 44 carried in sleeves 45 welded to the core tank 14. The arm is pivotable about the joint 42 into a vertical position (indicated in broken lines) to enable it to be withdrawn through the housing 44. Drive mechanism 46, which is supported on the upper shield 12 from which the shaft 43 depends, carries a boom or tiller 47 having a movable key 48. Location of the key over a selected strut causes the pintle 41 to be located below the core tube associated with the strut; a fuel unit carried by the pintle is raised or lowered by telescoping axial movement of the shaft 43, the arm 39 being held horizontal.

The reactor is provided with two sets of fuel handling apparatus (FIGURE 1) having arms of sufficient length to cover the whole lattice area with a considerable area of overlap in the centre. In practice the area of overlap corresponds to the active core area whilst the outer core tubes are reserved for breeder units containing fertile material and for storage of decaying fuel units. A fuel charge/discharge machine 49 is located over a port 51 which extends from the upper shield 12 down into the fuel handling section 17 of the core tank and which is accessible to both of the pintles 41. Fuel units are charged into the fuel handling section through this port. Access to the tiller 47 and the charge/discharge machine 49 is by a deck 52 spaced above the upper shield 12.

*Core tube assembly, struts, and fuel units*

The cellular core tube assembly (shown in detail in FIGURE 4) is constituted by a honeycomb assembly of the hexagonal tubes 31 which are welded together at the lower ends before the assembly is introduced into the reactor. The lower ends of these tubes are formed with slots 53 which permit cross flow of reactor coolant from one tube to an adjacent tube in the event that the inlet to one coolant tube becomes blocked. At their upper ends the tubes are provided with the waisted outlets 32 from each of which a sampling pipe 33 is taken. The core tube assembly which is supported by the baffle 21 is secured to a flange 54 of the baffle by means of spot welds 55 between the flange and the lower ends of adjacent tubes 31; this method of supporting the assembly is of sufficient strength since no substantial load is imposed on the assembly during reactor operation. Lateral stability is imparted to the assembly by means of a flange 56 welded to the baffle 21 at the level of the upper ends of the tubes 31.

The elongate fuel units for the reactor are conventional assemblies of nuclear fuel rods 57 (FIGURE 5). In each unit the fuel rods are suspended from an upper support grid 58, spaced by spacer grids 49, and housed in a hexagonal casing 61. Short breeder rods 62 containing fertile material are supported below the fuel rods by a support grid 63 and spaced by spacer grids 64; these breeder rods are also housed in the casing 61. At the lower end of each fuel unit the casing 61 carries a conical socket 65 to receive the pintle of the fuel handling apparatus. The socket incorporates a filter 66 to collect particulate impurities in reactor coolant entering the unit and is formed with an indent 67 to co-operate with a locking detent on the pintle. Slots 68 are formed in the lower end of the casing to co-operate with the slots 53 in the core tubes thus serving to permit cross flow of reactor coolant to one fuel unit from adjacent units in the event of the filter in the former becoming blocked. At its upper end each fuel unit is formed with a conical nosepiece 68 to be held in a socket 38 by a respective strut 37. The nosepiece (which is most clearly seen in FIGURE 6B) is constituted by a spider composed of three radial webs 69 welded to the upper end of the casing 61 and carrying a central threaded nut 71. When a fuel unit is in its operational position in a core tube 31, its nosepiece projects into the corresponding outlet 32.

The sockets 38 take the form of cylindrical chambers with lower ends open to receive the nosepiece 68 of fuel units; coned rims 72 afford seats for the nosepieces to butt against. At its upper end each socket is formed with a web 73 having a central boss 74 secured to a hollow shaft 75 which is itself carried by the respective strut 37. Instrumentation 76, such as a flowmeter, a microphone and thermocouples, is secured to the hollow shaft 75 and located within the outlet 32 so as to indicate parameters which are characteristics of an individual lattice channel. A spindle 77 slidable within each strut and its associated shaft 75 is journalled in the boss 74 and carries a threaded bolt 78 to be screwed into the nosepiece of a fuel unit. A rotary gag 79 mounted on the spindle 77 is located below the web 73 in the socket by means of indents 81; the gag is splined to the spindle by means of a key 82 sliding in a keyway 83 formed in the spindle. Radial vanes on the gag are positioned by rotation of the spindle to mask apertures through the web 73 to a greater or lesser degree and thus to control the flow of reactor coolant through the outlet 32.

The spindle and the strut together with instrumentation leads 85 extend upwardly through lower and upper plates 86, 87 constituting part of the upper shield 12, this shield having a box structure which is filled with neutron-shielding material such as borated steel granules. The strut is of thick section (FIGURE 9) with peripheral grooves to receive the leads 85 and a central bore to receive the spindle 77. Being of borated steel itself, the strut serves as a neutron shield plug. A standpipe 88 (FIGURE 10B) for each strut 37 extends upwardly from the upper plate 87. This standpipe has an upper spigot 89 upon which can rest a flange 91 at the upper end of the strut; sealing rings 92 provide a first seal between the strut and the standpipe. In practice the rim 89 is not loaded during reactor operation owing to the upward force exerted on the strut due to pressure of reactor coolant on an associated fuel unit; this upward force on the strut is countered by a shoulder 93 carried by a bonnet 94 which is tied to the standpipe by a flanged collar 95 screwed onto the standpipe. The bonnet may carry sealing rings on the end piece 96 to provide a second seal backing up the sealing rings 92; this second seal would be readily replaceable on removal of the bonnet. By means of the spigot 89 and the shoulder 93 any forces taken by the strut 37 are transmitted to the upper shield 12 which constitutes part of the reactor support platform.

The instrumentation leads traverse the bonnet 94 by means of electrical connector sockets 97 carried on pedestals 98 mounted on the strut flange 91 and connector pins 99 carried by the bonnet to enter these sockets when the bonnet is lowered onto the standpipe; a key carried by the bonnet is located in a keyway in the flange 91 when the bonnet is correctly aligned with the flange. Leads from the pins 99 are taken to sockets 101 carried by a cowl 102 mounted on the bonnet. Above the pins 99 the bonnet continues with a reduced diameter to a head 103 onto which is screwed a hood 104 which lies at the level of the deck 52 for access by operating personnel. The head carries replaceable sealing rings 105 to seal with the hood.

Within the bonnet the spindle 77 is connected by a telescopic coupling to an upper shaft 106 journaled in the head of the bonnet. Where the shaft projects from the bonnet it is of square section to form a male portion for co-operating with a female portion of a drive coupling carried in the key 48 of the fuel handling apparatus; at the bonnet head a seal is provided by sealing rings 107 carried by the shaft. A collar 108 carried by the shaft engages the head 103 to counter any upward thrust on the shaft. The telescopic coupling between the shaft 106 and the spindle 77 is constituted by a sleeve 109 which is pinned to the shaft and splined to the spindle. A seal between the spindle 77 and the strut flange 91 is provided by sealing rings 111. By virtue of the coupling, the spindle 77 floats in the strut and is positioned axially within the bonnet by means of two opposing coil springs 112, 113 which act on a collar 114 carried by the spindle. The lower spring 112 bears on the strut flange 91 and the upper spring 113 bears on the sleeve 109 of the telescopic coupling and thus reacts against the bonnet head 103.

*Loading and unloading*

To load a fuel unit carried by the pintle of the fuel handling apparatus into a core tube, the tiller is positioned over the core tube and the key carried by the tiller is engaged with the shaft 106 linked to the spindle 77 associated with the core tube. As a consequence of the location of the key over the tube, the pintle with the fuel unit is registered accurately below the tube. The arm carrying the pintle is then raised to enter the fuel unit into the tube until its nosepiece engages the bolt 78 carried by the spindle 77, the bolt being urged by the spring 113 to a lower position than that shown in FIGURE 6 when the core tube is empty. Having raised the fuel unit on the pintle to compress the spring 113 slightly and thus to ensure firm engagement between the nosepiece and the bolt, the spindle 77 is rotated by means of the drive coupling of the tiller key, and the fuel unit is drawn up on the bolt until the nosepiece makes firm engagement with the rim 72 of the socket carried by the strut. Rotation of the spindle is continued to compress the lower coil spring 112 and thus to urge the nosepiece into the socket under spring pressure. Finally the pintle is disengaged from the fuel unit. To unload a fuel unit this process is reversed.

When loaded in the assembly, a fuel unit is given lateral stability by the assembly; however, axial movement of the fuel unit in the assembly is countered by the respective strut without loading the assembly. Thus when reactor coolant is not being circulated through the assembly the dead weight of the fuel unit is taken by the spindle and transmitted through the coil spring 112 to the strut which is itself supported by the reactor support platform. On the other hand, when reactor coolant is circulated through the assembly any resultant upward thrust on the unit is transmitted to the support platform by a socket 38 and its associated strut 37. During reactor operation the flow of coolant through the core tubes may be controlled by rotating the gags 79 by means of the spindles 77; such rotation does not affect the position of the fuel unit, the slight axial movement of the spindle being absorbed by the coil springs 112 and 113.

By way of alternative to the foregoing example, the illustrated form of fuel handling apparatus need not necessarily be employed. As an example of other suitable forms, the reactor construction of FIGURES 11 and 12 has three rotary magazines 114, 115 and 116 situated in the bulbous fuel handling section 17 of the core tank 14. Such magazines are each suspended rotatably from an arm 117 which is carried by an upright shaft 118 corresponding to the shaft 43 of FIGURE 2.

Each magazine is a skeleton structure composed basically of a circular plate 119 having a number of openings passing through it, these openings being defined in the illustrated example by stub tubes, such as 120, fixed in the plate. For rotation of the plate, its periphery has teeth which mesh with a gear wheel 121, it being understood that the shaft 118 includes an inner drive spindle (not appearing in FIGURES 11 and 12) to which the gear wheel is fixed. Consequently the magazines are rotatable about both their own axes and the eccentric axes of their respective shafts 118, and the openings defined by the stub tubes 120 are so distributed that with these two modes of rotation one or other of the magazines is capable of registering a stub tube with every fuel unit position in the reactor core, here designated 122.

Associated with each magazine is a discharge port 123. This port corresponds with the port 51 of FIGURE 3 in that it extends from the support platform down into the fuel handling section 17; however the diameter is larger because in the present case the fuel units are transported in containers, such as those indicated 124 in the magazine 114. These containers are long enough for the whole length of a fuel unit to fit therein leaving clearance for coolant in which the unit will therefore be submerged. It is in such a container that a discharged fuel unit is withdrawn with the aid of a suitable grab through the discharge port 123, the coolant included with the unit in the container providing both thermal capacity and a thermal bond with the container walls whereby to aid heat dissipation from the unit in the event of temporary cessation of forced gas cooling for which provision is made in passage of the fuel unit into a charge/discharge machine 125 and, via the discharge machine, to a repository 126. The containers have an upper flanged rim by which they can be supported in a hanging position in the stub tubes 120 of the magazines.

In the region of the core 122, the core tube assembly 19 of the previous example is replaced by a grid structure 127 at the upper end of the core, the fuel units being modified in that the hexagonal casing (61 in FIGURE 5) is extended at the top end by a hollow spike adapted to fit into a respective grid structure opening, the extremity of the spike having a nut equivalent to 71 in FIGURE 6B. The grid structure, which is a fixture in the core tank, thus in effect provides fixed sockets in which to receive the fuel units; the net upward thrust on these units due to upward flow of coolant through the core is therefore applied to the grid structure which is constructed and fixed accordingly.

Although the struts 37 serve as previously to carry instrumentation to the tops of the fuel elements, their supporting function is limited to ensuring firm engagement of the fuel units with the grid structure 127 in the absence of net upward thrust on the units. More important, however, is the modification of the struts to enable the spindle 77 therein (FIGURES 6A and 6B) to be used as part of the fuel handling apparatus. For this purpose the spindle is so adapted that by the attachment of an extension piece to its top end it can be lowered through the region of the core 122 to bring its threaded bottom end 78 into attachable engagement with a fuel unit in a container in one of the rotary magazines 114, 115 and 116. The reader conversant with reactor design will readily perceive suitable modifications of the strut construction of the previous example to adapt the spindle for this added function and therefore detailed illustration is deemed to be unnecessary.

Loading of a fuel unit into a vacant position in the core 122 therefore comprises registering with the position in question a container 124 carried by one of the magazines 114, 115 or 116, such container having been previously charged into the magazine, with the new unit therein, by lowering through the discharge port 123, lowering the strut spindle 77 for the position in question by means of an extension piece, operating the spindle through the extension piece to attach the unit in the container to the spindle, and then raising the spindle to bring the unit to its service position in the grid structure 127. To unload a fuel unit, this process is reversed although of course the container registered to receive such unit must not be already occupied.

As a variant of the example of FIGURES 11 and 12, the grid structure may be arranged at the lower end of the core. This arrangement may be preferred if it is possible for full coolant flow through the core to persist after the core has been shut down; in such circumstances a top grid structure with upward coolant flow is subject to a sudden reduction of temperature and the thermal shock may lead to structural deterioration. By contrast, a bottom grid structure is at the cooler end of the core where this effect can be disregarded. By virtue of the bottom loading and unloading which the invention employs the holding down of the fuel units in a bottom grid structure against the upward thrust due to coolant flow does not raise the difficulties applicable to the more usual method of loading and unloading from the top; it suffices in the present case for the fuel units to be provided at their lower ends with projections which are brought into engagement with the bottom grid structure when the unit has been raised into position in the core.

It will be appreciated that with a bottom grid structure, there is not only the strut but also the fuel unit between the socket represented by the grid structure and the point from which the strut is supported. Changes in length due to thermal expansion are therefore considerable and to avoid jarring of the fuel units and struts due to abrupt changes of coolant flow rate when the core is hot it is preferred that a spring acting in the same manner as 112 in FIGURE 10A is adapted to be compressed sufficiently when the core is cold to remain still under tension when the reactor is operating at full load.

In more general respects, the construction of FIGURES 11 and 12 is also different from the previous example. Whereas previously the primary heat exchangers were accommodated in other tanks separate from the reactor vessel they are here included, as indicated at 127 in a single containment 128 accommodating the whole primary circuit, that is to say, the core tank 14 and pumps 129 as well as the heat exchangers 127. The pumps and heat exchangers are removable through shielding 130 by which the interior of the containment 128 is divided into upper and lower portions. In the lower portion, the reservoir of coolant is free to form free surfaces as indicated at 131 and in the upper portion is disposed such equipment as is necessary for the functioning of the charge/discharge machine 125, namely, a gantry crane 132 and a carriage 133 on rails 134.

What we claim is:
1. A nuclear reactor comprising a vessel to house a core of elongate nuclear fuel units, a support platform disposed to be above the core, means to circulate reactor coolant in the vessel through the core to abstract heat from fuel units thereof, rigid struts depending from the platform, means at the lower end of the struts by which the fuel units are attachable thereto for support in the core, and fuel handling apparatus to present fuel units beneath the struts for engagement with the attachment means.

2. A nuclear reactor comprising a vessel to house a core of elongate nuclear fuel units, a support platform disposed to be above the core, means to circulate reactor coolant in the vessel through the core to abstract heat from fuel units thereof, rigid struts depending from the platform and carrying sockets to receive the core fuel units, means included in the struts to hold the respective fuel units in firm engagement with the sockets and fuel handling apparatus to raise fuel units within the vessel into engagement with the attachment means of the struts.

3. A nuclear reactor as claimed in claim 2, in which the coolant circulating means is arranged to cause upward flow of the coolant through the core and in which there is fixed in the vessel a cellular structure defining for each core fuel unit a tubular outlet wherein is received the upper end of the respective fuel unit and the lower end of the strut to which the unit is attached.

4. A nuclear reactor as claimed in claim 3, in which each tubular outlet is provided with an individual coolant sampling pipe.

5. A nuclear reactor as claimed in claim 2, in which the lower end of each strut incorporates a variable flow restrictor to control flow of coolant through the respective tubular outlet, and hence over the fuel unit associated with such outlet, the restrictor being adjustable by operating means extending through the strut.

6. A nuclear reactor comprising a vessel, a cellular structure fixed in the vessel and composed of an assembly of juxtaposed parallel open-ended tubes, fuel units disposed respectively in the tubes to form a core, means to circulate reactor coolant upwardly through the tubes to abstract heat from the fuel units, a support platform disposed above the core, rigid struts dependent from the support platform, means at the lower ends of the struts establishing with the fuel units a connection which supports the units in the tubes and is detachable by remote operation at the upper ends of the struts, and fuel handling apparatus to present fuel units beneath the struts for connecting to the last-mentioned means.

7. A nuclear reactor comprising a vessel to house a core of elongate nuclear fuel units, a support platform disposed to be above the core, means to circulate reactor coolant in the vessel through the core to abstract heat from fuel units thereof, a grid structure fixed in the vessel and adapted to locate the core fuel units against upward movement, rigid struts depending from the platform, means at the lower ends of the struts by which the fuel units are attachable thereto for support against the grid structure, and fuel handling apparatus to present fuel units beneath the struts for engagement with the attachment means.

8. A nuclear reactor as claimed in claim 7, in which the attachment means of each strut is lowerable through the grid structure to engage a fuel unit presented beneath the strut at a position below the core.

9. A nuclear reactor comprising a vessel, elongate nuclear fuel units juxtaposed in parallel relationship in the vessel to form a core, means to circulate reactor coolant upwardly through the core to abstract heat from the fuel units, a grid structure fixed in the vessel and adapted to locate the fuel units against upward thrust thereon due to the coolant flow through the core, a support platform disposed above the core, rigid struts dependent from the support platform, means at the lower ends of the struts establishing with the fuel units a connection which supports the units against the grid structure and is detachable by remote operation at the upper ends of the struts, a fuel unit discharge port penetrating the vessel wall, a fuel unit magazine having fuel unit storage positions and mounted in the vessel beneath the core, for displacement between positions aligning the storage positions respectively with the struts and the discharge port, and means for lowering the connection means of the struts through the grid structure to enable fuel units to be deposited in the storage positions of the magazine and to be drawn up therefrom into the core.

10. A nuclear reactor comprising a vessel, a support platform included as part of the vessel, struts dependent from the platform and means at their lower ends for suspending fuel units detachably in the form of a core, fuel handling apparatus to present fuel units beneath the struts for attachment to the lower ends thereof, and instrumentation carried by each of the struts to perform a monitoring function at the lower end of the respective strut.

No references cited.

L. DEWAYNE RUTLEDGE, *Primary Examiner.*

LEON D. ROSDOL, *Examiner.*